United States Patent [19]
Breidohr et al.

[11] Patent Number: 5,853,647
[45] Date of Patent: Dec. 29, 1998

[54] PROCESS FOR THE STABILIZATION OF THE PROPERTIES OF CELLULOSIC MEMBRANES

[75] Inventors: Hans-Günther Breidohr; Michael Pelger; Panajotis Argyriadis, all of Wuppertal, Germany

[73] Assignee: Akzo Nobel NV, Arnhem, Netherlands

[21] Appl. No.: 806,924

[22] Filed: Feb. 26, 1997

[30] Foreign Application Priority Data

Mar. 7, 1996 [DE] Germany ............... 196 08 840.2

[51] Int. Cl.$^6$ .............. B29B 17/00; B01D 33/21; B01D 39/00
[52] U.S. Cl. .............. 264/345; 210/500.23; 210/500.29; 210/500.3; 210/500.31; 264/342 RE; 264/342 R
[58] Field of Search .............. 210/500.29, 500.3, 210/500.31, 636; 264/48, 49, 211.17, 342 RE, 342 R, 345

[56] References Cited

U.S. PATENT DOCUMENTS

| | | |
|---|---|---|
| 3,133,137 | 5/1964 | Loeb et al. ............... 210/500.269 |
| 3,439,074 | 4/1969 | Sharples et al. ............... 264/41 |
| 3,671,516 | 6/1972 | Hillman et al. ............... 264/195 |
| 4,230,463 | 10/1980 | Henis et al. . |
| 4,291,470 | 9/1981 | Newman ............... 34/12 |
| 4,496,456 | 1/1985 | Hafez et al. . |
| 4,681,713 | 7/1987 | Miyagi et al. . |
| 4,857,201 | 8/1989 | Black et al. ............... 210/655 |
| 5,011,637 | 4/1991 | Overman, III et al. . |

FOREIGN PATENT DOCUMENTS

| | | |
|---|---|---|
| A-0 155 534 | 9/1985 | European Pat. Off. . |
| 131941 | 8/1978 | Germany . |
| 30 42 110 A1 | 6/1982 | Germany . |
| A-30 42 110 | 6/1982 | Germany . |
| 60-058210 | 4/1985 | Japan . |
| 2 086 798 A | 5/1982 | United Kingdom . |

OTHER PUBLICATIONS

Derwent Abstract An 78–76528A [43] (English–language Abstract corresponding to DD 131941).
Patent Abstract of Japan (English–language Abstract corresponding to JP 60 058210).
Chemical Abstract No. 103:56070 CA (English–language corresponding to JP 60 058210).
Derwent Abstract AN 85–118693 (English Abstract corresponding to JP 60 058210).

*Primary Examiner*—Ana Fortuna
*Attorney, Agent, or Firm*—Oliff & Berridge, PLC

[57] ABSTRACT

Properties of cellulosic membranes such as the length and the ultrafiltration rate are stabilized by warmth/humidity conditioning, whereby temperatures in a range of about 30° to 60° C. and relative humidities in a range of about 10 to 60% are suitable. The membranes may be enveloped at a relative humidity of about 40 to 60% and at about 20° to 25° C. in a packaging which is at least substantially impermeable to the passage of moisture before being subjected to the conditioning.

8 Claims, 1 Drawing Sheet

PROCESS FOR THE STABILIZATION OF THE PROPERTIES OF CELLULOSIC MEMBRANES

BACKGROUND OF THE INVENTION

1. Field of the Invention

The invention relates to a process for the stabilization of the properties of cellulosic membranes.

2. Discussion of Related Art

After the manufacture of cellulosic membranes as described for example in DE-A-30 42 110 and EP-A-0 155 534, and during storage, membrane properties such as the ultrafiltration rate (UFR) and linear behavior change. Only after a long period of storage do the membrane properties attain a state which subsequently only changes slightly, so that this state can be described as stable. The storage time necessary before the stable state is achieved is generally several months. Such membranes can have flat, tubular or hollow-fiber embodiments.

The cellulosic membranes are used for dialysis, hemodialysis, hemofiltration, hemodiafiltration, gas separation, microfiltration, nano- and/or ultrafiltration and—provided with a ligand—as affinity membranes. For this purpose, the membranes are built into appropriate devices which are divided into two spaces by the membranes. For this to be effected, the membranes must be embedded in a leakproof manner. Once the stable state has been attained, the membranes have more uniform UFR performances and can be built into the aforementioned devices without any problem. For example, leakage problems arising from the embedding are much reduced.

As mentioned already, a storage period of several months is generally required in order to attain the stable state. If one tries to build the membranes into the aforementioned devices before the stable state has been attained, for example in order to reduce storage costs, handling problems may arise, because on the one hand the dimensions of the aforementioned devices are set in advance, and on the other hand membrane properties such as for example the linear behavior are still in the process of change. For this reason, the membrane manufacturer cannot guarantee with sufficient confidence the membrane stability required in further processing.

In the case of hollow-fiber membranes wound onto bobbins, an additional feature is that before attaining the stable state, the hollow fibers have a tendency, even in the bundle, to retain the shape imposed upon them by the bobbin (bobbin memory). After the bundles are cut, this behavior of the hollow fibers leads to a considerable degree of fan-out of individual capillaries, making leakproof embedding more difficult. The result of this can be leakage problems.

The manufacturer of cellulosic membranes is faced with a choice of two alternatives: either to store the membranes for several months in order to guarantee that further processing can be conducted without any problems, or to shorten the storage period, as a result of which, however, the risk of a higher reject rate during further processing increases. Thus the manufacturer of cellulosic membranes is forced to compromise between storage costs and quality, both of which are unsatisfactory whatever decision the manufacturer makes.

SUMMARY OF THE INVENTION

It is therefore one object of the present invention to make available a process for the stabilization of cellulosic membranes which at least reduces the drawbacks described.

These and other objects are achieved by a process for the stabilization of cellulosic membranes in which the cellulosic membranes are conditioned at a temperature between, for example, about 30° and 60° C. and at a relative humidity between, for example, about 10 and 60%. Membranes which are subjected to the conditioning process according to the invention thereafter display stable properties such as ultrafiltration rate and length. Surprisingly, the membranes conditioned according to the invention attain the stable state in a much shorter time compared to the storage time required up to now. The conditioning process according to the invention makes it possible to attain a stable state in a conditioning time which may only amount to a third or an even smaller fraction of the storage time required up to now.

DETAILED DESCRIPTION OF PREFERRED EMBODIMENTS

Figure 1:
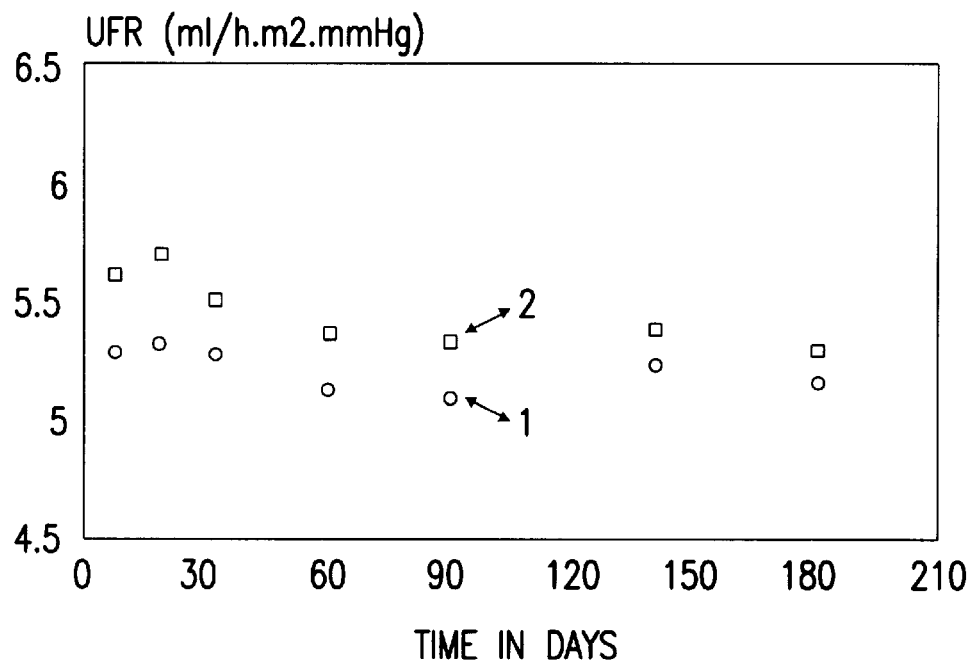
FIG. 1 shows a diagram of the UFR of conditioned hollow fibers and hollow fibers stored in the normal manner, as a function of time.

The conditioning is performed advantageously in a time amounting to about 10 to 250 hours. Using the conditioning process according to the invention, the membrane manufacturer is now able to make available stable cellulosic membranes after a much shorter time, which membranes are equally as amenable to problem-free further processing as the membranes stored for several months.

It is expedient to select a shorter conditioning time for thin membranes while longer conditioning times are required for thicker membranes. For hollow-fiber membranes, the required conditioning also depends among other things on the fluid which was used in the manufacture of the membranes in order to guarantee the presence of the cavity, if the fluid is still contained in the hollow fiber during conditioning. By "fluids" is meant gases, liquids and mixtures thereof. For example, for the hollow-fiber membranes available under the trade name Hemophan® MC 65, manufactured with the fluid isopropyl myristate, with a wall thickness of 6.5 $\mu$m, a period of about 48 hours is required, whereas the hollow-fiber membranes available under the trade name Hemophan® MC 58, manufactured with the fluid isopropyl myristate, with a wall thickness of 8.0 $\mu$m, need a conditioning time of about 96 hours in order to attain a stable state.

The times required for the conditioning process, which depend for example on the wall thickness and the fluid, can be determined by simple experimental series.

A preferred range of temperatures at which the conditioning is to be conducted is between, for example, about 35° and 50° C., more preferably between about 38° and 42° C.

A preferred range for the relative humidity at which the conditioning is to be conducted is a value between, for example, about 10 and 40%.

It is advantageous for the membranes to be wound on suitable devices after manufacture and prior to conditioning. For example, hollow-fiber membranes are wound on bobbins and flat membranes on tubes, and subsequently subjected to conditioning. The membranes stabilized after the conditioning generally no longer have a tendency to return to the shape imposed upon them by the winding device. For this reason, membranes stabilized in this fashion can easily be built into the devices already described and do not, for example, display any changes of shape.

In the case of hollow-fiber membranes wound onto bobbins after manufacture and prior to conditioning, an additional feature is that the membranes stabilized after conditioning display practically no fan-out of individual capillaries. Thus, after the bundle has been built into the aforementioned devices, leakage problems, for example arising from the embedding, are much reduced.

An especially favored embodiment from the point of view of making the performance of the conditioning process as simple as possible comprises enveloping the membranes after manufacture but prior to the stabilization conditioning in a material which is at least substantially impermeable to the passage of moisture. The enveloping is at, for example, about 20° to 25° C. and a relative humidity of, for example, about 40 to 60%, preferably at 22° C. and 50% relative humidity. The overall quantity of water enclosed in the packaging makes it possible to create a microclimate required for conditioning simply by setting the required conditioning temperature. The use of expensive climatic cabinets, not to mention climatic conditioning of whole warehouses, is not necessary using the conditioning process according to the invention.

The invention will be described in more detail with reference to the example given below and FIGS. 1 and 2.

EXAMPLE

Type PC 55 Cuprophan® hollow-fiber membranes (lumen: 200 μm, wall thickness: 8 μm, inner filling: isopropyl myristate) are wound on bobbins after manufacture. At about 22° C. and a relative humidity of about 50%, the bobbins are packaged in polyethylene bags. In a further packaging process, the bobbins together with the bags are placed in polypropylene casings. These casings are sealed and conditioned in an oven at a temperature of 40°±2° C. at the relative humidity arising in the polyethylene bags of about 10 to 20%. In the same fashion reference bobbins are packaged and stored in the normal manner at about 22° C. At definite intervals of time, conditioned hollow fibers and those stored in the normal manner are removed from the packaging and their UFR and length measured. The results of the measurements are shown in FIGS. 1 and 2.

FIG. 1 shows a diagram of the UFR of conditioned hollow fibers (circular measurement points 1) and hollow fibers stored in the normal manner (square-shaped measurement points 2), as a function of the conditioning and storage time respectively. The UFR is given as an absolute value. A hollow fiber not subjected to the conditioning process according to the invention has a UFR of about 5.8 (ml/h m$^2$mmHg) (not drawn in FIG. 1). Whereas the hollow fibers stored in the normal manner only attain a stable UFR after about 90 days, the hollow fibers conditioned according to the invention display a stable UFR level after only about 30 days. The position of the level shows that after only 30 days, the conditioned membranes have attained a measure of UFR stability which the hollow fibers stored in the normal manner do not yet possess even after 180 days.

Figure 2:
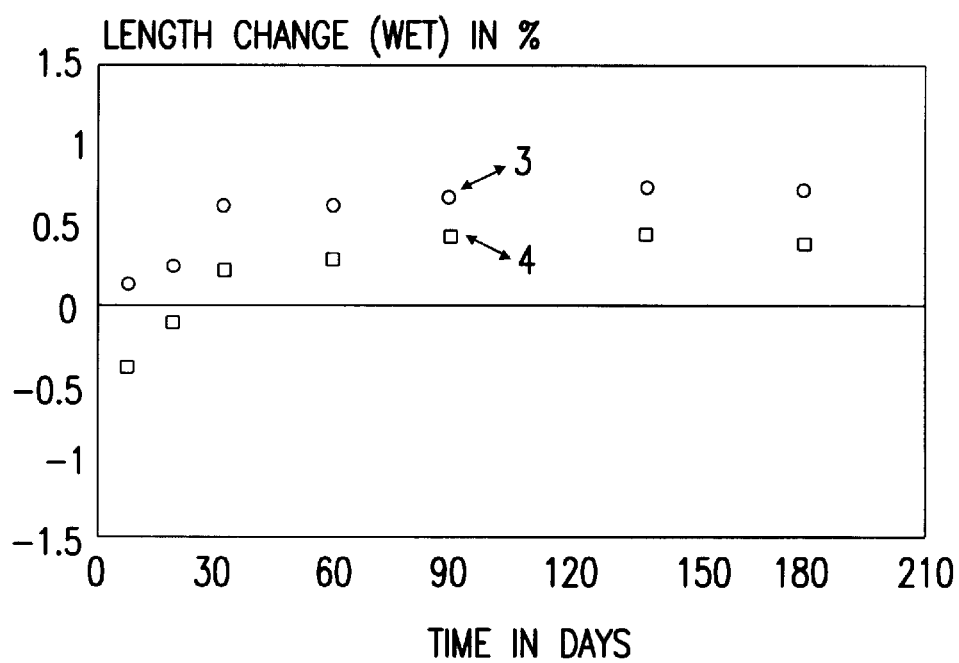
FIG. 2 shows a diagram of the length changes of conditioned hollow fibers arising during wetting (circular measurement points 3) and of hollow fibers stored in the normal manner (square-shaped measurement points 4) as a function of time.

In a further diagram, FIG. 2 shows the length changes of conditioned hollow fibers (circular measurement points 3) arising during wetting with water and of hollow fibers stored in the normal manner (square-shaped measurement points 4) as a function of the conditioning and storage time, respectively. The length change is given as a percentage of the initial value (initial value is equal to 100%). A hollow fiber not subjected to the conditioning process according to the invention shrinks by about 0.5% on being wetted with water (not drawn in FIG. 2). Whereas the hollow fibers stored in the normal manner only attain a stable length after about 90 days, the hollow fibers conditioned according to the invention display a stable length level after only about 30 days. The position of the level shows that after only 30 days, the conditioned membranes have attained a measure of length stability which the hollow fibers stored in the normal manner do not yet possess even after 180 days.

What is claimed is:

1. Process for the stabilization of the properties of cellulosic membranes comprising
    conditioning the cellulosic membranes at a temperature between about 30° C. and 60° C. and at a relative humidity between about 10% and 60%, wherein prior to the conditioning, the cellulosic membranes are enveloped at a relative humidity of about 40% to 60% and at a temperature of about 20° C. to 25° C. in packaging which is at least substantially impermeable to the passage of moisture.

2. Process in accordance with claim 1, wherein the cellulosic membranes are subjected to the conditioning conditions for a period of about 10 to 250 hours.

3. Process in accordance with claim 1, wherein the cellulosic membranes are subjected to the conditioning conditions at a temperature between about 35° and 50° C.

4. Process in accordance with claim 3, wherein the cellulosic membranes are subjected to the conditioning conditions at a temperature between about 38° and 42° C.

5. Process in accordance with claim 1, wherein the cellulosic membranes are subjected to the conditioning conditions at a relative humidity of about 10 to 40%.

6. Process in accordance with claim 1, wherein the cellulosic membranes are wound up before being subjected to the conditioning.

7. Process in accordance with claim 1, wherein the cellulosic membranes are enveloped at a relative humidity of about 50% and at a temperature of about 22° C.

8. Process in accordance with claim 1, wherein the cellulosic membranes are hollow-fiber membranes.

* * * * *